United States Patent
Carberry et al.

(10) Patent No.: US 11,256,039 B2
(45) Date of Patent: Feb. 22, 2022

(54) METHODS AND SYSTEMS FOR LASER CLEAVING OPTICAL FIBERS

(71) Applicant: CORNING OPTICAL COMMUNICATIONS LLC, Charlotte, NC (US)

(72) Inventors: Joel Patrick Carberry, Big Flats, NY (US); Minghan Chen, Saint Johns, FL (US); Ming-Jun Li, Horseheads, NY (US); Anping Liu, Horseheads, NY (US); Barada Kanta Nayak, Painted Post, NY (US)

(73) Assignee: Corning Optical Communications LLC, Corning, NY (US)

(*) Notice: Subject to any disclaimer, the term of this patent is extended or adjusted under 35 U.S.C. 154(b) by 0 days.

(21) Appl. No.: 16/850,167

(22) Filed: Apr. 16, 2020

(65) Prior Publication Data

US 2020/0241213 A1     Jul. 30, 2020

Related U.S. Application Data

(63) Continuation of application No. PCT/US2018/056161, filed on Oct. 16, 2018.
(Continued)

(51) Int. Cl.
*G02B 6/38* (2006.01)
*B23K 26/382* (2014.01)
(Continued)

(52) U.S. Cl.
CPC .......... *G02B 6/3833* (2013.01); *B23K 26/073* (2013.01); *B23K 26/382* (2015.10); *G02B 6/25* (2013.01)

(58) Field of Classification Search
CPC ...... G02B 6/3833; G02B 6/25; B23K 26/382; B23K 26/073
See application file for complete search history.

(56) References Cited

U.S. PATENT DOCUMENTS

| | | | |
|---|---|---|---|
| 7,142,741 B2 | 11/2006 | Osborne | |
| 7,754,999 B2 * | 7/2010 | Pollard | B23K 26/1435 219/121.69 |

(Continued)

FOREIGN PATENT DOCUMENTS

| | | |
|---|---|---|
| EP | 1330331 A1 | 7/2003 |
| WO | 02/34452 A1 | 5/2002 |
| WO | 2004003612 A1 | 1/2004 |

OTHER PUBLICATIONS

Atakaramians et al., Cleaving of Extremely Porous Polymer Fibers, DOI: 10.1109/JPHOT.2009.2038796, IEEE Photonics Journal, V. 1, N. 6, 2009 (Year: 2009).*
(Continued)

*Primary Examiner* — Peter Radkowski
(74) *Attorney, Agent, or Firm* — Kapil U. Banakar

(57) ABSTRACT

A method of cleaving an optical fiber comprises inserting the optical fiber through a bore of a holding member, securing the optical fiber to the holding member with a bonding agent, operating at least one laser to emit at least one laser beam, and directing the at least one laser beam from the at least one laser to the end face of the holding member. At least a portion of the at least one laser beam reflects off the end face of the holding member and is thereafter incident on an end portion of the optical fiber. The at least one laser beam cleaves the end portion of the optical fiber less than 20 µm from the end face of the holding member. Related systems are also disclosed.

41 Claims, 12 Drawing Sheets

Related U.S. Application Data

(60) Provisional application No. 62/579,188, filed on Oct. 31, 2017.

(51) Int. Cl.
    *B23K 26/073*    (2006.01)
    *G02B 6/25*    (2006.01)

(56) References Cited

U.S. PATENT DOCUMENTS

| | | | | |
|---|---|---|---|---|
| 8,702,322 | B1 | 4/2014 | Danley et al. | |
| 9,010,151 | B2* | 4/2015 | Fujii | C03B 33/082 65/95 |
| 9,089,931 | B1* | 7/2015 | Carberry | G02B 6/25 |
| 9,109,879 | B2* | 8/2015 | Li | G01B 11/0658 |
| 9,416,046 | B2* | 8/2016 | Carberry | G02B 6/3833 |
| 9,588,303 | B2* | 3/2017 | Danley | G02B 6/3833 |
| 9,764,427 | B2* | 9/2017 | Sercel | B23K 26/402 |
| 10,272,522 | B2* | 4/2019 | Gaebelein | B23K 26/0622 |
| 10,343,237 | B2* | 7/2019 | Sercel | B23K 26/361 |
| 10,941,070 | B2* | 3/2021 | Altman | B23K 26/53 |
| 2003/0155328 | A1* | 8/2003 | Huth | B23K 26/125 216/65 |
| 2003/0155336 | A1* | 8/2003 | Kreuter | B23K 26/0604 219/121.76 |
| 2004/0227794 | A1* | 11/2004 | Pollard | B23K 26/1435 347/86 |
| 2006/0209224 | A1* | 9/2006 | Nakanishi | C03B 33/091 349/56 |
| 2008/0067158 | A1* | 3/2008 | Levesque | G02B 6/25 219/121.72 |
| 2012/0027358 | A1* | 2/2012 | Webb | G01B 11/02 385/78 |
| 2012/0051706 | A1* | 3/2012 | van Geffen | G02B 6/3833 385/134 |
| 2013/0091897 | A1* | 4/2013 | Fujii | C03B 33/0222 65/112 |
| 2013/0146572 | A1* | 6/2013 | Watanabe | B23K 26/0648 219/121.72 |
| 2014/0157561 | A1* | 6/2014 | van Geffen | G02B 6/3833 29/271 |
| 2015/0218038 | A1* | 8/2015 | Carberry | G02B 6/3833 65/392 |
| 2016/0059349 | A1* | 3/2016 | Sercel | B23K 26/402 65/32.1 |
| 2016/0059354 | A1* | 3/2016 | Sercel | B23K 26/361 264/400 |
| 2016/0067827 | A1* | 3/2016 | Zediker | B23K 26/144 219/76.12 |
| 2016/0368090 | A1* | 12/2016 | Gaebelein | B23K 26/1462 |
| 2017/0050877 | A1* | 2/2017 | Altman | C03B 33/091 |

OTHER PUBLICATIONS

Boyd et al., "High precision 9.6 µm CO2 laser end-face processing of optical fibres," Opt. Express 23, 15065-15071 (2015) (Year: 2015).*

Sugioka et al., "Precision laser ablation of wide-band-gap materials using VUV-UV multiwavelength excitation," Proc. SPIE 3683, Laser Optics '98: Superstrong Laser Fields and Applications, (Dec. 30, 1998); doi: 10.1117/12.334805 (Year: 1998).*

Atakaramians et al; "Cleaving of Extremely Porous Polymer Fibers"; IEEE Photonics Journal; vol. 1, No. 6; (2009) pp. 286-292.

Baker et al; "Fiber Bragg Gratings for Stress Field Characterization Inside a Connector"; Proc. SPIE 3848, (1999) pp. 207-211.

Bertholds et al; "Determination of the Individual Strain-Optic Coefficients in Single-Mode Optical Fibers"; Journal of Lightwave Technology; vol. 6; No. 1 (1988) pp. 17-20.

Canning et al; "UV Laser Cleaving of Air-Polymer Structured Fibre"; Optics Communications; 202 (2002) pp. 139-143.

Chen et al; "Endoscope Lens With Dual Fields of View and Resolutions for Multiphoton Imaging"; Optics Letters, vol. 35, No. 16; (2010) pp. 2735-2737.

Choi et al; "Three-Dimensional Direct Femtosecond Laser Writing of Second-Order Nonlinearities in Glass"; Optics Letters; vol. 37, No. 6 (2012) pp. 1029-1031.

Egner et al; "Comparison of the Axial Resolution of Practical Nipkow-Disk Confocal Fluorescence Microscopy With That of Multifocal Multiphoton Microscopy: Theory and Experiment"; Journal of Microscopy; vol. 206, Pt 1; (2002) pp. 24-32.

Ermer et al; "Wavelength-Dependent Modification of Insulator Surfaces by a Picosecond Infrared Free-Election Laser"; Proc. SPIE 3343, High-Power Laser Ablation; (1998) pp. 109-118.

International Search Report and Written Opinion of the International Searching Authority; PCT/US2018/056161; dated Apr. 16, 2019; 26 Pages; European Patent Office.

Kitamura et al; "Optical Constants of Silica Glass from Extreme Ultraviolet to Far Infrared at Near Room Temperature"; Applied Optics; vol. 46, No. 33; (2007) pp. 8118-8133.

Montarou et al; "Residual Stress Profiles in Opitcal Fibers Determined by the Two-Waveplate-Compensator Method"; Optics Communications, 265 (2006) pp. 29-32.

Myers et al; "Large Second-Order Nonlinearity in Poled Fused Silica"; Optics Letters; vol. 16, No. 22 (1991) pp. 1732-1734.

Straub et al; "High Speed Axial Scanning in a Temporal Focusing Setup With Piezo Bimorph Mirror Dispersion Tuning"; Proc. SPIE 3848, Optical Fiber Reliability and Testing, (1999) 2 Pages.

* cited by examiner

METHODS AND SYSTEMS FOR LASER CLEAVING OPTICAL FIBERS

CROSS REFERENCE TO RELATED APPLICATIONS

This application is a continuation of International Application No. PCT/US18/56161, filed on Oct. 16, 2018, which claims the benefit of priority to U.S. Application No. 62/579,188, filed on Oct. 31, 2017, both applications being incorporated herein by reference.

BACKGROUND

The disclosure relates generally to optical fibers and more particularly to methods and systems for laser cleaving one or more optical fibers that have been secured to a ferrule or other holding member.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another fiber optic connector or adapter, an optical fiber in the ferrule is positioned in a known, fixed location relative to the housing. This allows an optical connection to be established when the optical fiber is aligned with another optical fiber provided in the mating component (the other fiber optic connector or adapter).

The bore of the ferrule in a fiber optic connector may extend from a rear of the ferrule to a front of the ferrule. With such a design, an optical fiber can be passed through the ferrule so as to extend beyond an end face at the front of the ferrule. After securing the optical fiber relative to the ferrule (e.g., by using a bonding agent in the bore), an optical surface may be formed on the optical fiber. The optical surface is typically formed a precise distance from the end face of the ferrule according to very tight dimensional standards to reduce signal attenuation. For example, the optical surface of the optical fiber may need to be formed within a few microns of the end face of the ferrule.

One conventional method of forming an optical surface involves a mechanical cleaving step followed by several mechanical polishing steps. Such methods can be time-consuming and labor-intensive due to the number of polishing steps required to form the optical surface within a few microns of the end face of the ferrule. For example, it may be necessary to begin with coarse grit when mechanically polishing and switch to finer grits in subsequent polishing steps to carefully control the distance of the end of the optical fiber from the end face of the ferrule and to form an optical surface of high quality.

Various techniques for laser cleaving and polishing an optical fiber are also known. Although these techniques may help reduce or eliminate some of the mechanical polishing steps associated with forming an optical surface, there remains room for improvement.

SUMMARY

One embodiment of the disclosure relates to a method of cleaving an optical fiber. The method comprises: inserting the optical fiber through a bore of a holding member, such as a ferrule for an optical fiber connector, so that an end portion of the optical fiber extends past an end face the holding member; securing the optical fiber to the holding member with a bonding agent that is disposed within at least a portion of the bore; operating at least one laser to emit at least one laser beam; and directing the at least one laser beam from the at least one laser to the end face of the holding member so that at least a portion of the at least one laser beam reflects off the end face of the holding member and is thereafter incident on the end portion of the optical fiber. The holding may comprise zirconia. The at least one laser is operated and the at least one laser beam is directed so that the at least one laser beam comprises a laser fluence of less than 100 J/cm$^2$ when the at least a portion of the at least one laser beam is incident on the end face of the holding member, and so that the at least one laser beam cleaves the end portion of the optical fiber less than 20 μm from the end face of the holding member.

Another embodiment of this disclosure is a method of cleaving an optical fiber comprising: inserting the optical fiber through a bore of a holding member so that an end portion of the optical fiber extends past an end face of the holding member; securing the optical fiber to the holding member with a bonding agent that is disposed within at least a portion of the bore; operating at least one laser to emit at least one laser beam; and directing the at least one laser beam from the at least one laser to the end face of the holding member. The at least one laser is operated so that the at least one laser beam cleaves the end portion of the optical fiber by: ablating some of the end portion of the optical fiber with the at least one laser beam emitted at a first wavelength; tuning the at least one laser to a different wavelength; and ablating an additional amount of the end portion of the optical fiber with the at least one laser beam emitted at the different wavelength.

Systems related to the methods mentioned above are also disclosed. In particular, systems for laser cleaving an end portion of an optical fiber that protrudes from an end face of a holding member after extending through a bore of the holding member. One embodiment of such a system comprises at least one laser configured to emit at least one laser beam. The system also comprises a fixture configured to securely support the holding member relative to the at least one laser. The system is configured to direct the at least one laser beam to the end face of the holding and operate the at least one laser so that: at least a portion of the at least one laser beam reflects off the end face of the holding member and is thereafter incident on the end portion of the optical fiber; the at least one laser beam comprises a laser fluence of less than 100 J/cm$^2$ when the at least a portion of the at least one laser beam is incident on the end face of the holding member, and the at least one laser beam cleaves the end portion of the optical fiber less than 20 μm from the end face of the holding member.

Alternatively or additionally, the system may be configured to direct the at least one laser beam to the end face of the holding and operate the at least one laser so that the at least one laser beam cleaves the end portion of the optical fiber by: ablating some of the end portion of the optical fiber with the at least one laser beam emitted at a first wavelength; and ablating an additional amount of the end portion of the optical fiber with the at least one laser beam emitted at the different wavelength.

Features and advantages will be set out in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
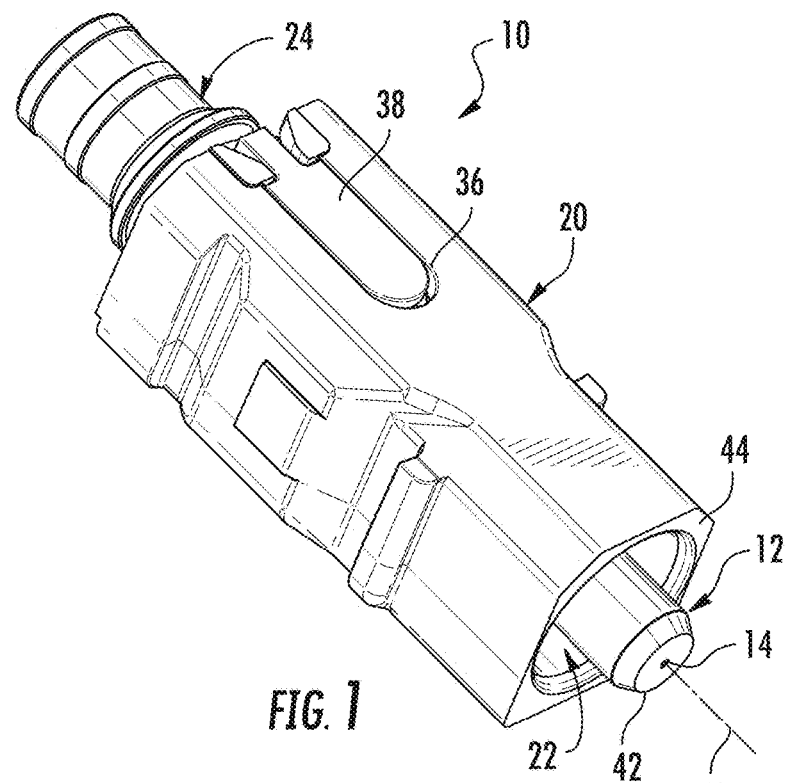
FIG. 1 a perspective view of an example of a fiber optic connector.
Figure 2:
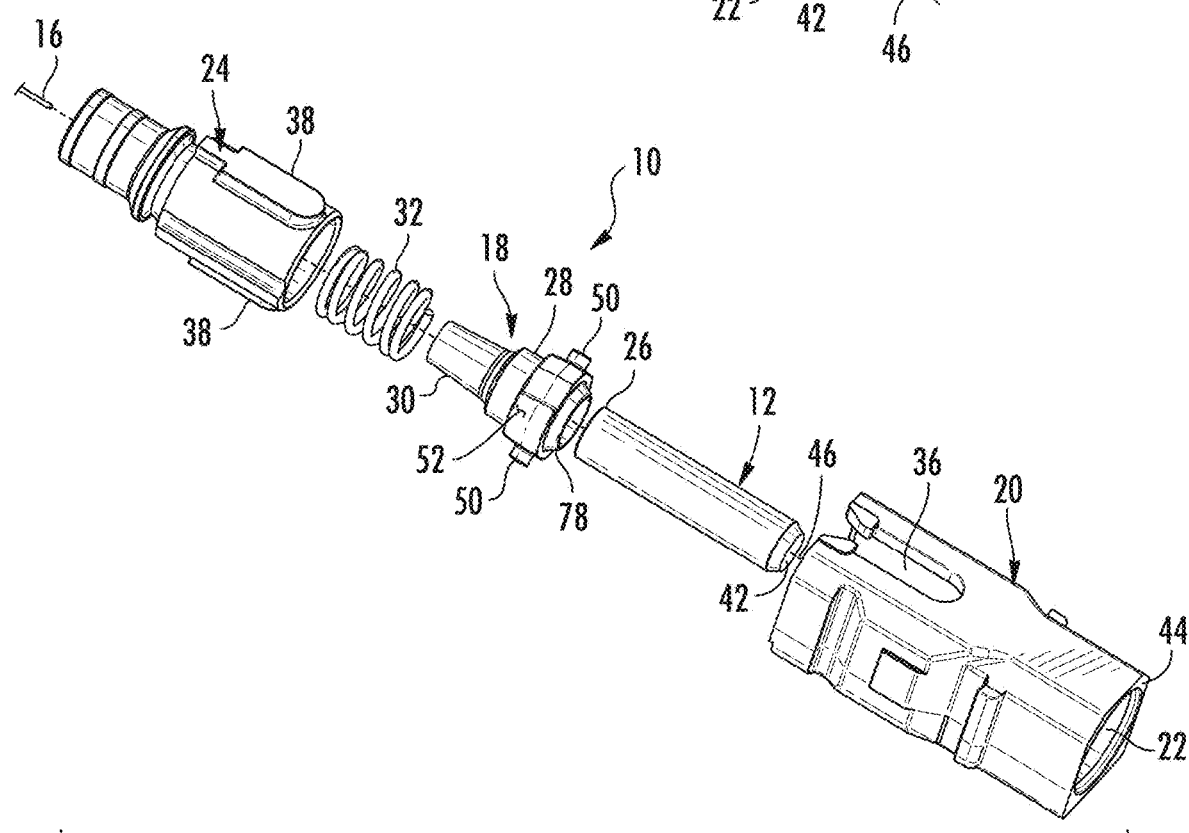
FIG. 2 is an exploded perspective view the fiber optic connector of FIG. 1.

Various embodiments will be further clarified by examples in the description below. In general, the description relates to systems and methods for laser cleaving one or more optical fibers that have been secured to a holding member, such as a ferrule of a fiber optic connector. To this end, the methods may be part of terminating one or more optical fibers from a fiber optic cable with a fiber optic connector to form a cable assembly. One example of a fiber optic connector 10 ("connector 10") for such a cable assembly is shown in FIGS. 1 and 2. Although the connector 10 is shown in the form of a SC-type connector, the methods described below may be applicable to processes involving different fiber optic connector designs. This includes ST, LC, MPO, and other single fiber or multi-fiber connector designs, for example.

As shown in FIGS. 1 and 2, the connector 10 includes a ferrule 12 having a ferrule bore 14 ("micro-hole") configured to support an optical fiber 16, a ferrule holder 18 from which the ferrule 12 extends, a housing 20 having a cavity 22 in which the ferrule holder 18 is received, and a connector body 24 (also referred to as "inner housing 24", "retention body 24", or "crimp body 24") configured to retain the ferrule holder 18 within the housing 20. More specifically, a back end 26 of the ferrule 12 is received in a first portion 28 of the ferrule holder 18 and is secured therein in a known manner (e.g., press-fit, adhesive, molding the ferrule holder 18 over the back end 26 of the ferrule 12, etc.). The ferrule 12 and ferrule holder 18 may even be a monolithic structure in some embodiments. For convenience, the term "ferrule assembly" may be used to refer to the combination of the ferrule 12 and ferrule holder 18, regardless of whether these elements are separate components secured together or different portions of a monolithic structure.

The ferrule holder 18 is biased to a forward position within the housing 20 by a spring 32, which extends over a second portion 30 of the ferrule holder 18 that has a reduced cross-sectional diameter/width compared to the first portion 28. The spring 32 also interacts with internal geometry of the connector body 24, which may be secured to the housing 20 using a snap-fit or the like. For example, FIGS. 1 and 2 illustrate a rear portion of the housing 20 having cut-outs or slots 36 on opposite sides so as to define a split shroud. The connector body 24 has tabs 38 configured to be snapped into the slots 36 and retained therein due to the geometries of the components.

Figure 3:
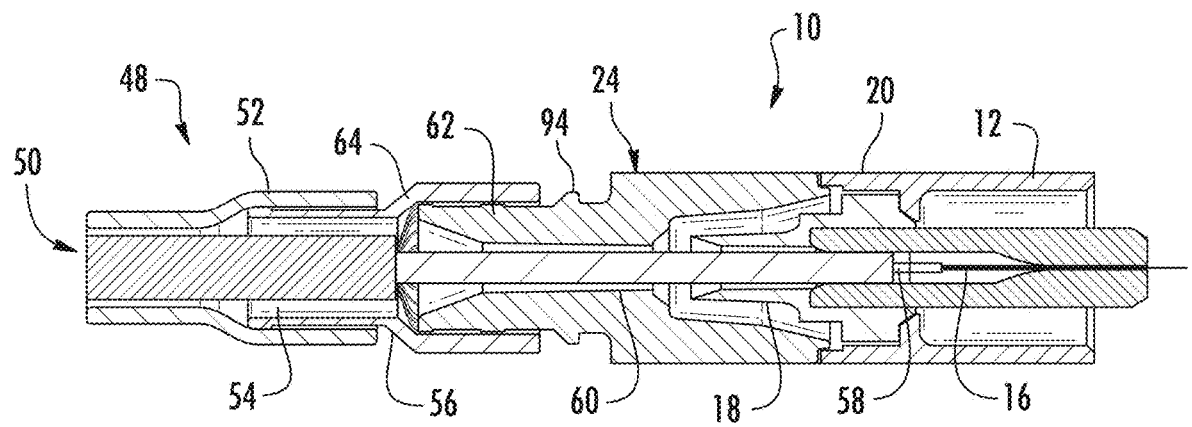
FIG. 3 is schematic cross-sectional view the fiber optic connector of FIG. 1 installed onto a fiber optic cable.

When the connector 10 is assembled as shown in FIG. 1, an end face 42 (i.e., front end) of the ferrule 12 projects beyond a front end 44 of the housing 20. The end face 42 presents the optical fiber 16 for optical coupling with a mating component (e.g., another fiber optic connector; not shown). Note that the ferrule 12 aligns the optical fiber 16 along a longitudinal axis 46. These aspects can be better appreciated with reference to FIG. 3, which shows how a fiber optic cable 50 (hereinafter "cable 50") including the optical fiber 16 can be terminated with the connector 10 (note: the spring 32 is omitted for clarity). In other words, the connector 10 can be installed on the cable 50 to form a cable assembly 48. The cable 50 is merely an example to facilitate discussion. In the embodiment shown, the cable 50 includes an outer jacket 52, inner jacket 54, strength members 56 in the form of aramid yarn, and the optical fiber 16, which itself includes a coating 58 and a buffer layer 60 ("tight buffer"). Portions of the outer jacket 52 and inner jacket 54 have been removed from the optical fiber 16 to expose the strength members 56, which are cut to a desired length and placed over a rear portion 62 of the connector body 24. The strength members 56 are coupled to the connector body 24 by a crimp band 64 (also referred to as "crimp ring") that has been positioned over the optical fiber 16 and a portion of the strength members 56 and inner jacket 54. Again, the cable 50 is merely an example, as persons skilled in optical connectivity will appreciate how different cable designs may be terminated with the connector 10.

Additionally, as mentioned above, the connector 10 is merely one example of a fiber optic connector that may be used in the systems and methods described below. The general overview has been provided simply to facilitate discussion of the systems and methods. Indeed, the systems and methods disclosed may be applicable not only to other connector designs and termination processes, but also to other situations where it is necessary to cleave one or more optical fibers extending from a holding member (e.g., a substrate or work piece). In this regard, the ferrule 12 can generally be considered one example of a holding member.

Figure 4:
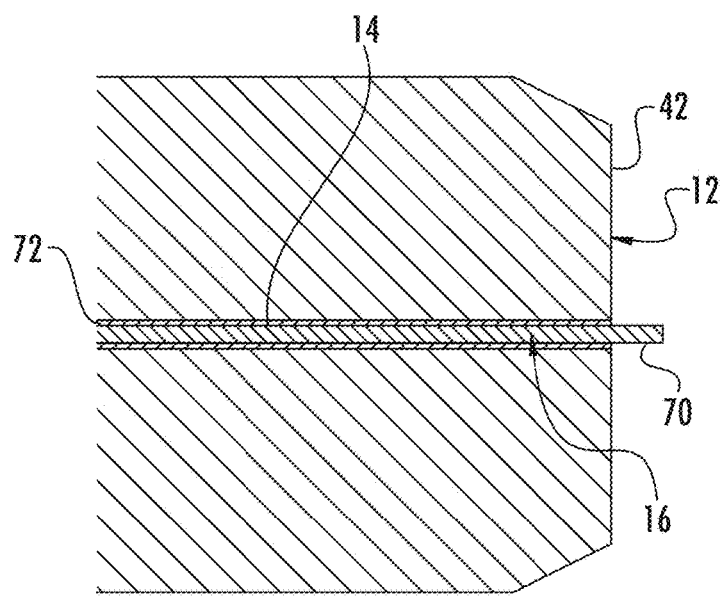
FIG. 4 is a cross-sectional side view of a portion of a ferrule of the fiber optic connector of FIG. 1, wherein an optical fiber is secured in the ferrule by a bonding agent.

FIG. 4 illustrates a portion of the ferrule 12 in further detail after the optical fiber 16 has been inserted into the ferrule bore 14. The optical fiber 16 is inserted from a rear of the ferrule bore 14 and extended until an end portion 70 of the optical fiber 16 exits an opening on the end face 42 of the ferrule 12. Thus, the end portion 70 extends past the end face 42. At least a portion of the optical fiber 70 remaining in the ferrule bore 14 is secured to the ferrule 12 by a bonding agent 72 (also referred to as an "adhesive composition"). Securing the optical fiber 16 to the ferrule 12 facilitates processing the end portion 70 of the optical fiber 16 to form a cleaved surface. The systems and methods describe below involve using one or more lasers to complete such processing.

Figure 5:
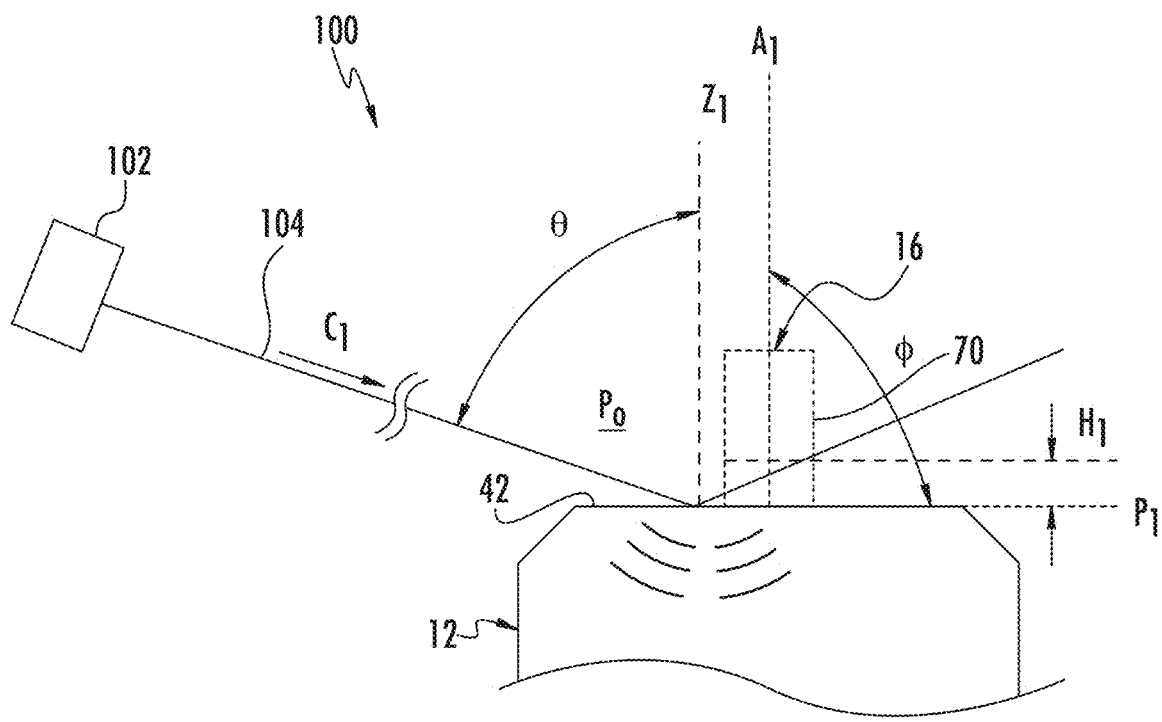
FIG. 5 is a schematic side view of one embodiment of a laser cleaving system.

To this end, FIG. 5 illustrates one embodiment of a laser cleaving system 100 for cleaving the optical fiber 16 very close to the end face 42 of the ferrule 12. The laser cleaving system 100 includes a laser 102 configured to emit a laser beam 104 that ultimately cleaves the end portion 70 of the optical fiber 16. For example, energy from the laser beam 104 may melt or ablate the end portion 70 to form a cleaved surface. As will be described in further detail below, the laser beam 104 is directed to the end face 42 so that at least a portion of the laser beam 104 first reflects off the end face 42 before being incident on the end portion 70 of the optical fiber 16.

With this in mind, it can be appreciated how FIG. 5 is a schematic side view orthogonal to a plane of incidence $P_0$ formed by a propagation direction $C_1$ of the laser beam 104 and a vector $Z_1$ that is perpendicular to the portion of the end face 42 on which the laser beam 104 is incident. Although the end face 42 is shown as being flat (i.e., planar), it will be appreciated that the end face 42 may have some amount of curvature to conform to geometric requirements for a particular type of physical contact. Examples of different physical contact geometries include, but are not limited to, physical contact (PC), angled physical contact (APC), and ultra physical contact (UPC) geometries. Still referring to FIG. 5, an angle of incidence θ (theta) is defined between the vector $Z_1$ and the propagation direction $C_1$. The optical fiber 16 has an optical axis $A_1$ extending from the ferrule 12 at an angle ϕ (phi) relative to a geometric plane $P_1$ containing the end face 42 of the ferrule 12. Although the optical axis $A_1$ is shown as being perpendicular to the end face 42 in the embodiment shown, other configurations where angle ϕ is not 90° are also possible. Regardless, at least a portion of the laser beam 104 reflects off the end face 42 and is thereafter incident on the end portion 70 of the optical fiber 16 in a manner that cleaves the optical fiber 16 a distance $H_1$ from the end face 42.

The distance $H_1$ may be less than 20 μm, or even less than 10 μm. To obtain such small distances, other laser cleaving systems involve directing the entirety of a laser beam to be incident on the end portion 70 of the optical fiber 16 before reaching the end face 42 and/or quickly scanning/sweeping a laser beam across the optical fiber 16 to avoid continued impingement (and damage resulting from such impingement) on an area of the end face 42. The methods and systems according to this disclosure involve a different, counterintuitive approach, namely intentionally and repeatedly directing at least some energy toward a location on the end face 42 of the ferrule 12 (i.e., the component where absorption of thermal energy is not desired) rather than the optical fiber 16. Whereas conventional approaches may involve relatively high amounts of laser energy per unit area (i.e., laser fluence) to cleave the optical fiber 16, the methods and systems according to this disclosure utilize a low laser fluence, such as less than 100 J/cm².

A cleaved surface may still be formed within 20 μm of the end face 42 without the ferrule 12 cracking due to thermal absorption and expansion when laser fluence is less than 100 J/cm² and when the ferrule 12 comprises zirconia. Persons skilled in optical connectivity will appreciate different parameters of the laser cleaving system 100 that may be varied to achieve the desired laser fluence, such as the power of the laser 102, duration or exposure time of each pulse, size of a beam spot on the end face 42 of the ferrule 12 (discussed below), etc. In some embodiments, laser fluence is less than 20 J/cm², or even lower, such as less than 10 J/cm². The low laser fluence may mean lower power requirements compared to conventional approaches, which in turn may reduce the costs associated with the laser cleaving system 50. Additionally, by appropriately controlling laser fluence, there may be a wide range of possible wavelengths for the laser 102. For example, the laser 102 may emit the laser beam 104 with a wavelength between 200 nm and 11 μm.

Figure 6:
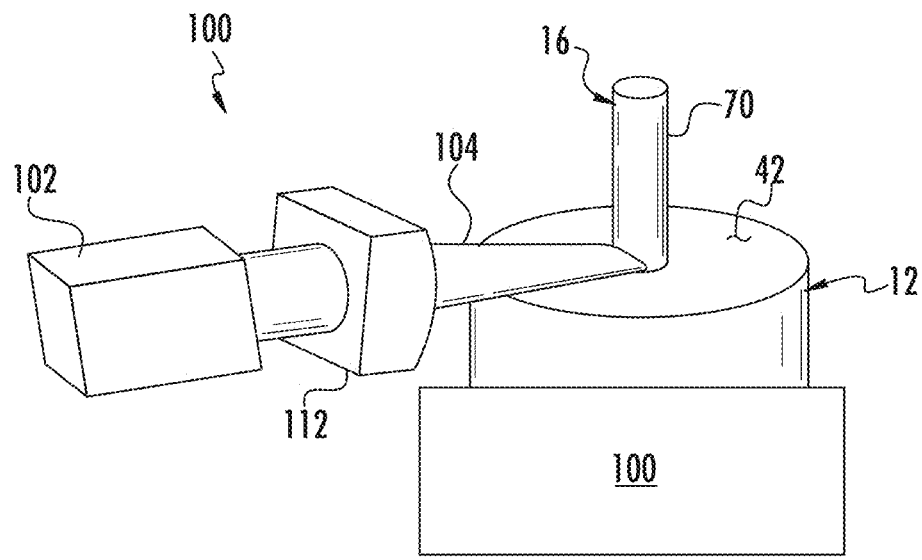
FIG. 6 is a schematic perspective view of the laser cleaving system of FIG. 5.

FIGS. 6-9 illustrate various aspects of one embodiment of the laser cleaving system 100 and associated methods of cleaving the optical fiber 16. As schematically shown in FIG. 6, the laser cleaving system 100 includes the laser 102 and a fixture 110 configured to securely support the ferrule 12 relative to the laser 102. The laser 102 and ferrule 12 are stationary and spaced apart. Thus, the laser cleaving system 100 is static; no relative movement between the profile of the laser beam 104 and the ferrule 12 occurs while the laser beam 104 is emitted. Such a system may be advantageous for manufacturing settings, as the complexities associated with relative movement are avoided. Nevertheless, if desired in other embodiments, there may be relative movement while the laser beam 104 is emitted (e.g., the laser beam 104 sweeping past the ferrule 12 or vice-versa). An example of such an embodiment is described further below. There may also be embodiments where there is only relative movement between periods of time when the laser beam 104 is emitted. For example, operating the laser 102 for several pulses in a first position relative to the ferrule 12 and optical fiber 16, and then before operating the laser 102 again, moving the laser 102 or fixture 110 so that the laser 102 is in a second position relative to the ferrule 12 and optical fiber 16.

Figure 7:
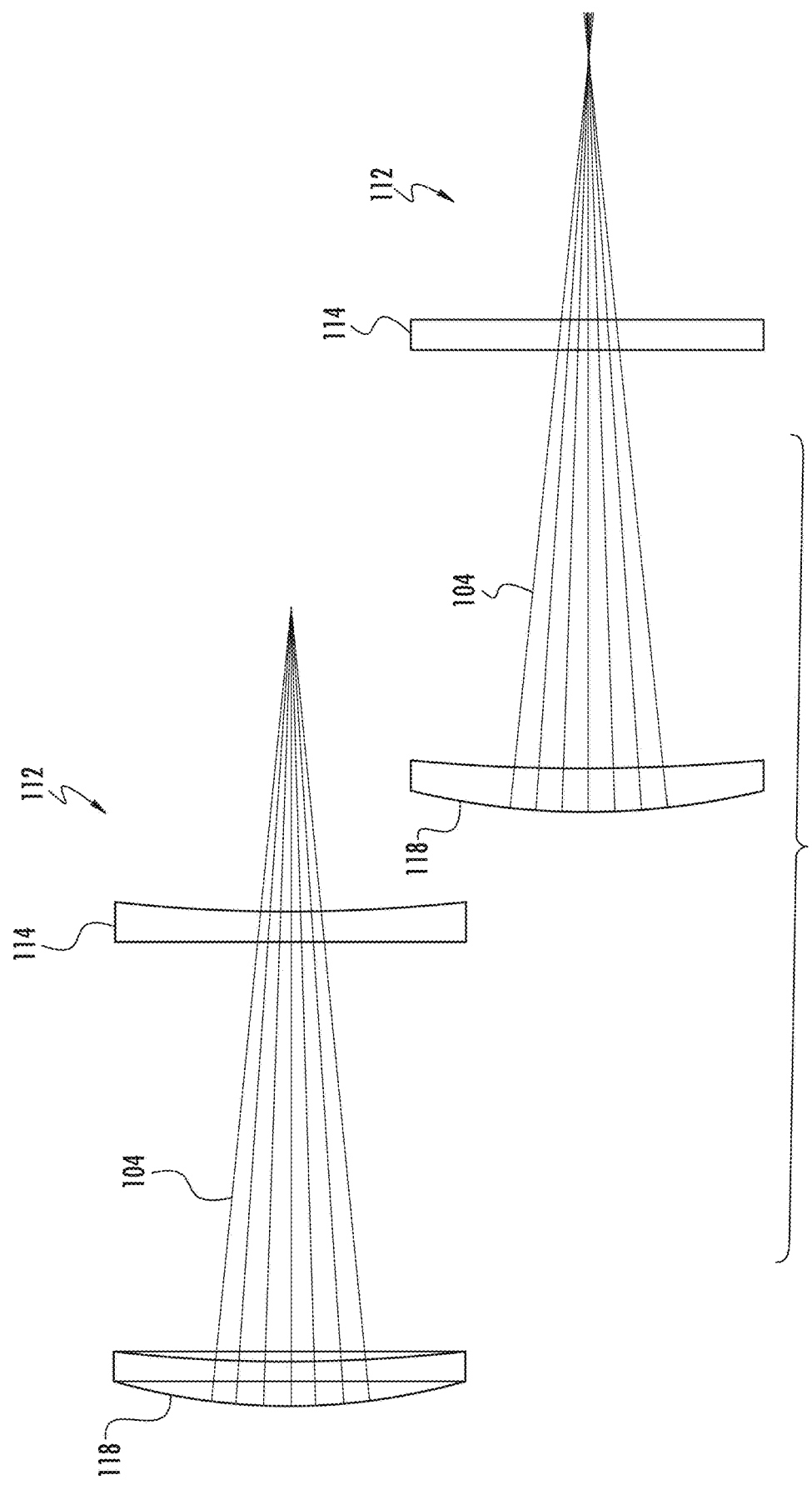
FIG. 7 is a schematic top view and schematic side view of a focusing system for forming an elliptical laser beam.

Still referring to FIG. 6, the laser cleaving system 100 is configured so that the laser 102 emits an elliptical beam on the end face 42 of the ferrule 12. To this end, the laser cleaving system 100 may include a focusing system 112 having one or more non-spherical lenses or other elements configured to shape the laser beam 104 into an ellipse (when viewed perpendicular to the propagation direction $C_1$; FIG. 5). The focusing system 112 may, for example, include a cylindrical or a cylindrical lens 114 (FIG. 7) to focus the width of the laser beam 104 in one plane. The cylindrical or acylindrical lens 114 may be used in addition to a spherical lens 118, as schematically shown in FIG. 7. In such embodiments, the width of the laser beam 104 in a first plane is determined by the focusing characteristics of both the spherical lens 118 and cylindrical lens 114 and the distance between them. The cylindrical lens 114 has no focus power in the second plane. Such a configuration results in the laser beam 114 having an elliptical profile with both a major radius and minor radius smaller than an initial radius of the laser beam 114.

Figure 8:
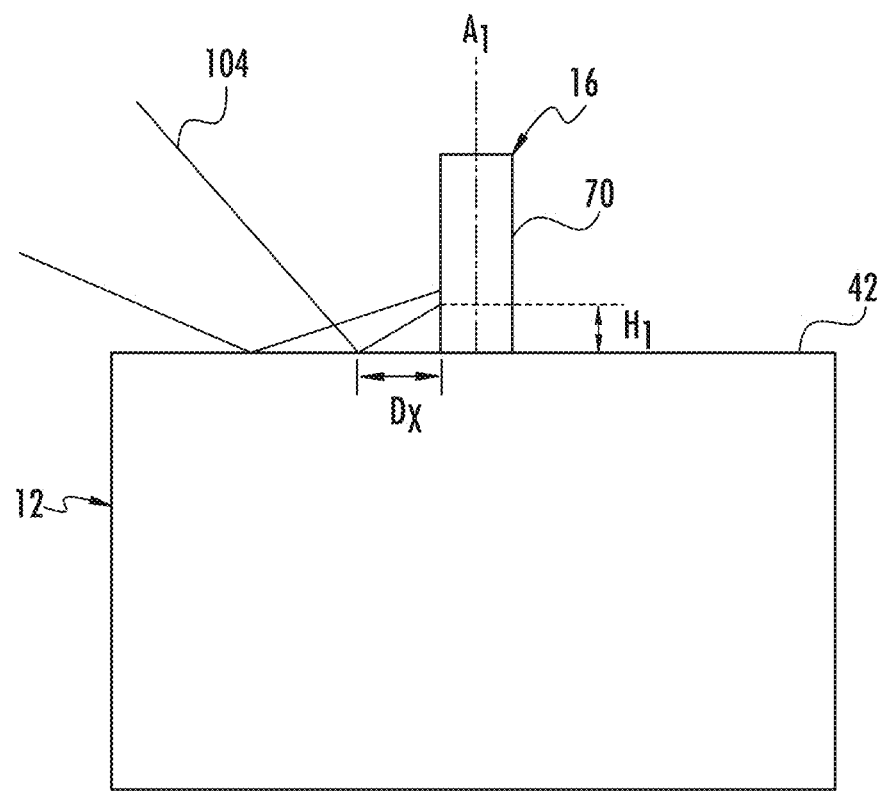
FIGS. 8 and 8A are schematic side view of a laser beam being emitted and reflected off an end face of a ferrule to be incident on an optical fiber.
Figure 9:
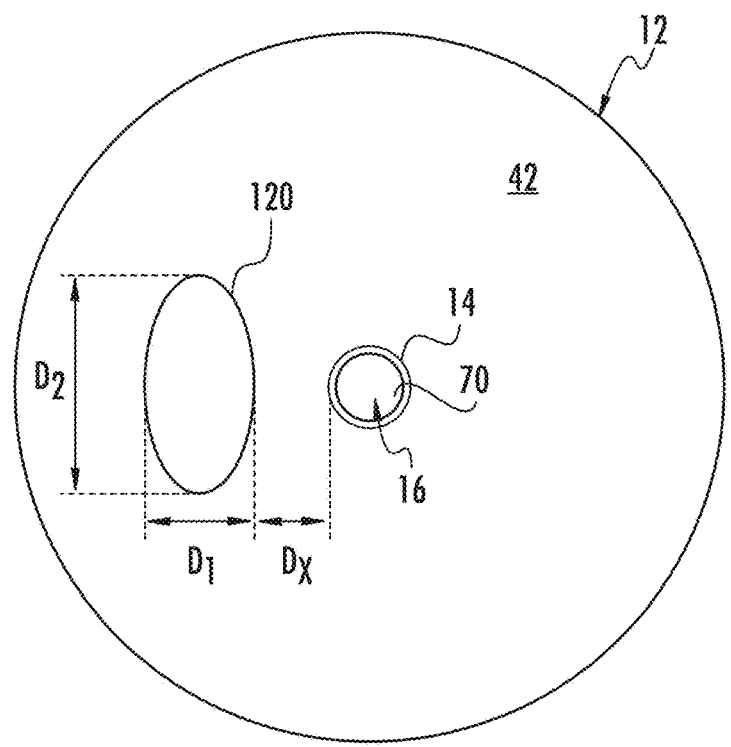
FIGS. 9 and 9A are schematic top views of the ferrules represented in FIGS. 8 and 8A, respectively, with the laser beam that is emitted forming an elliptical beam spot on the end face of the ferrules.

FIGS. 8 and 9 schematically illustrate the interaction between the laser beam 104, end face 42 of ferrule 12, and end portion 70 of optical fiber 16. The elliptical laser beam 104 results in an elliptical beam spot 120 on the end face 42. The beam spot 120 in the embodiment shown in FIGS. 8 and 9 is located a distance $D_x$ from the ferrule bore 14 (measured edge-to-edge) and has a dimension of $D_1$ along a minor axis and a dimension of $D_2$ along a major axis. The distance $D_x$ may be, for example, between 5 μm and 40 μm in some embodiments. Directing the laser beam 104 so that the distance $D_x$ is at least 5 μm helps reduce the absorption of laser energy in the bonding agent 72 (FIG. 4), which may be subject to melting and/or degradation if excessive amounts of laser energy are absorbed. Such melting and/or degradation may, in turn, undesirably affect adhesion strength or accurate positioning between the optical fiber 16 and ferrule 12. Appropriately setting the distance $D_x$ is believed to be particularly desirable for the bonding agents contemplated at the end of this description.

Figure 8A:
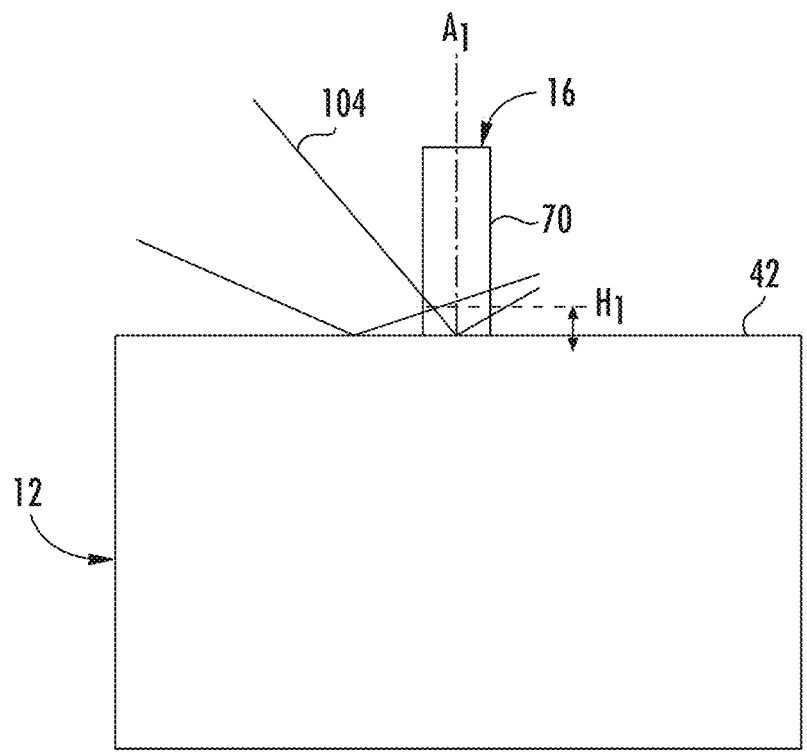
Figure 9A:
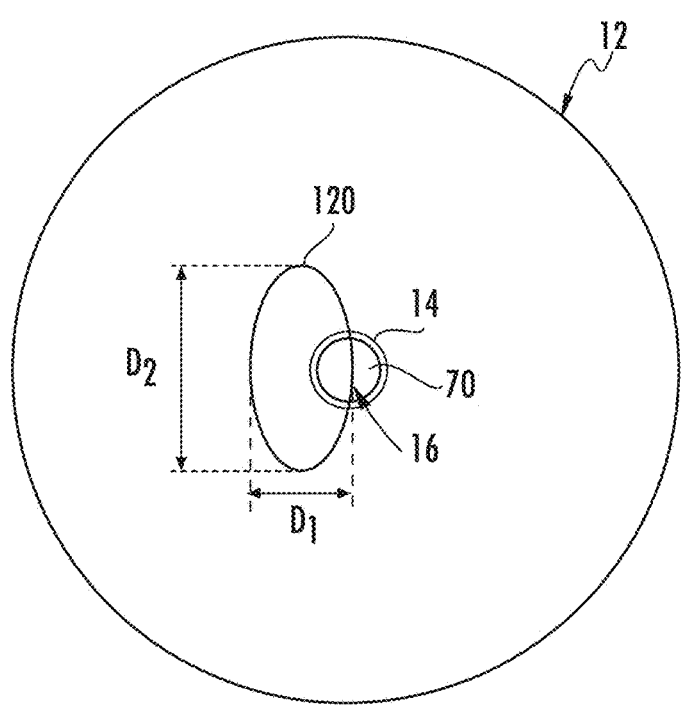

That said, the distance $D_x$ may be negative in some embodiments, but such that at least a portion of the laser beam 104 still reflects off the end face 42 of the ferrule 12 before being incident on the optical fiber 16. FIGS. 8A and 9A schematically illustrate an example of such an embodiment. The beam spot 120 partially overlaps the ferrule bore 14, which means that a first portion of the laser beam 104 may be first incident on the end face 42 of the ferrule 12, and a second portion of the laser beam 104 may be first incident on the bonding agent 72 in the ferrule bore 14 and the optical fiber 44 (specifically, on portions of the optical fiber 16 extending through the ferrule bore 14 and past the end face 42). When the laser fluence is kept low, such as less than 100 J/cm$^2$ or even less than 20 J/cm$^2$, undesired melting and/or degradation of the bonding agent 72 in the ferrule bore 42 may still be avoided.

Regardless of whether all or some of the laser beam 104 reflects off the end face 42 before being incident on the optical fiber, the reflection helps enable the "close" cleave (e.g., the cleaved surface being less than 20 μm from the end face 42). One of the sources of cracks on the end face 42 when using conventional laser cleaving methods and systems is molten debris, from either the optical fiber 16 or bonding agent 72, falling onto the end face 34. In the methods and systems according to this disclosure, the potential for debris itself is lowered due to the low laser fluence, and the manner in which at least some of the laser beam 104 is moving away from the end face 42 where any such debris is formed reduces the potential for the debris to fall on the end face 42. It is believed that the reflecting beam increases the likelihood that debris—to the extent any is formed—is ablated so as to never reach the end face 42. Thus, without reflection of the laser beam 104, the optical fiber 16 may need to be cleaved further away from the end face 42 of the ferrule 12 so that debris from the laser cleaving process can cool before landing on the end face 42.

Additionally, the wavelength of the laser beam 104 may be selected to further reduce the potential for damage to the ferrule 12. For example, in some embodiments where the optical fiber 16 comprises silica, the laser 102 may emit the laser beam 104 with a wavelength between 8.0 μm and 9.4 μm. At such wavelengths the silica material of the optical fiber 16 has a relatively high absorption of the laser energy, thereby reducing the potential for molten debris from unablated material. Additionally, the zirconia material of the ferrule 12 has a relatively low absorption of the laser energy, thereby reducing the potential for the ferrule 12 to crack from thermal expansion. Specific examples of lasers operating within this advantageous wavelength range include $CO_2$ lasers (e.g., a 9.3 μm $CO_2$ laser) and quantum cascade lasers (QCLs).

Still referring to FIGS. 8, 8A, 9, and 9A, the aspect ratio of the beam spot 120 defined by the ratio of $D_1$ to $D_2$ may be between about 2 and about 50 in some embodiments. For example, $D_2$ may be at least 30 μm in some embodiments such that $D_1$ is between about 60 μm and 1500 μm. Such aspect ratios and dimensions help enable a cleave less than 20 μm from the end face 42 at angles of incidence θ (FIG. 5) that further help avoid excessive amounts of laser energy being absorbed by the ferrule 12. In some embodiments, the angle of incidence θ may be between 45° and 85°. In other embodiments, the angle of incidence θ may be between 67° and 85°, particularly if the laser beam 104 comprises at least 90 percent linearly-polarized light configured to be incident on the ferrule 12 as S-polarized light (discussed below). In still other embodiments, the angle of incidence θ may be between 75° and 85°.

The principles described above may be applicable to laser cleaving systems having a variety of configurations. Several examples will now be described, although only differences from the laser cleaving system 100 will be discussed for clarity and conciseness.

Figure 10:
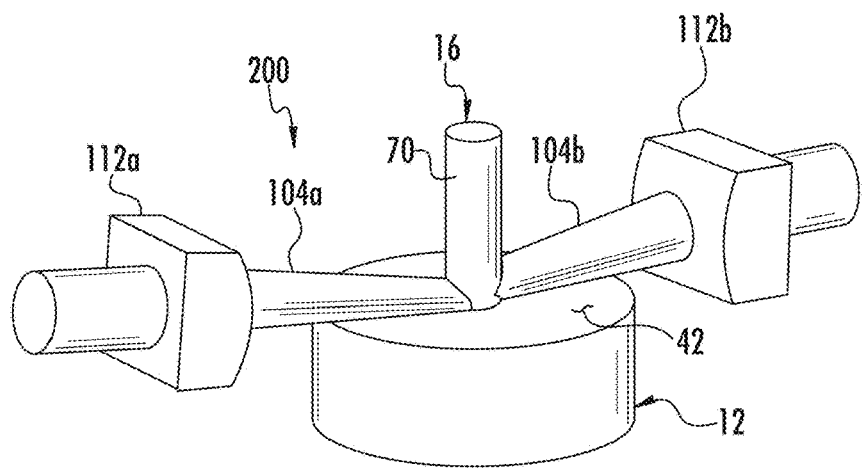
FIG. 10 is a schematic perspective view of another embodiment of a laser cleaving system.
Figure 10A:
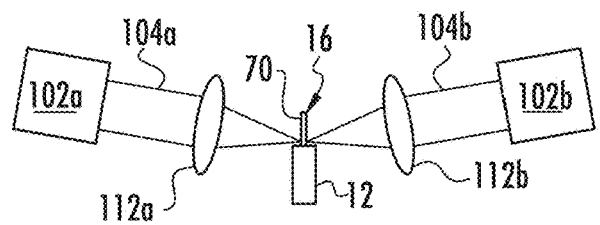
FIG. 10A is a schematic diagram the laser cleaving system of FIG. 10.

To this end, FIGS. 10 and 10A schematically illustrate an example of a laser cleaving system 200 in which two laser beams 104a, 104b are used to cleave the end portion 70 of the optical fiber 16. The laser beams 104a, 104b may be emitted from respective lasers 102a, 102b and are shaped into elliptical beams by respective focusing systems 112a, 112b. Each laser beam 104a, 104b is incident on the end face 42 of the ferrule 12 at a different location and, as a result, reflects off the end face 42 to be incident on the end portion 70 of the optical fiber 40 at a different location. The overall laser energy required to cleave the end portion 70 can be split between the laser beams 104, 104 so that the overall energy delivered to the end face 42 of the ferrule 12 is spread over a larger area (e.g., two beam spots at two different locations instead of a single beam spot). Although only two lasers 102a, 102b are shown in FIG. 10, embodiments involving a different number of lasers and laser beams will be appreciated (e.g., three or four lasers and laser beams).

Figure 11:
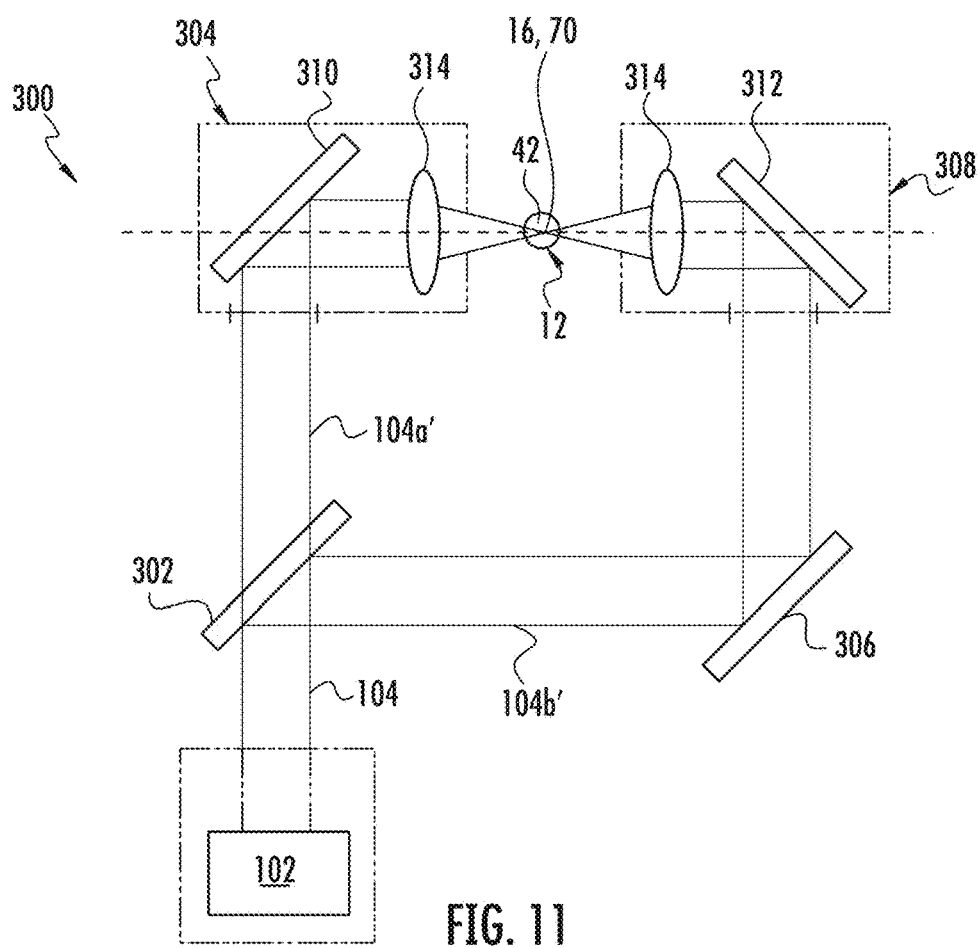
FIG. 11 is a schematic diagram of yet another embodiment of a laser cleaving system.
Figure 12:
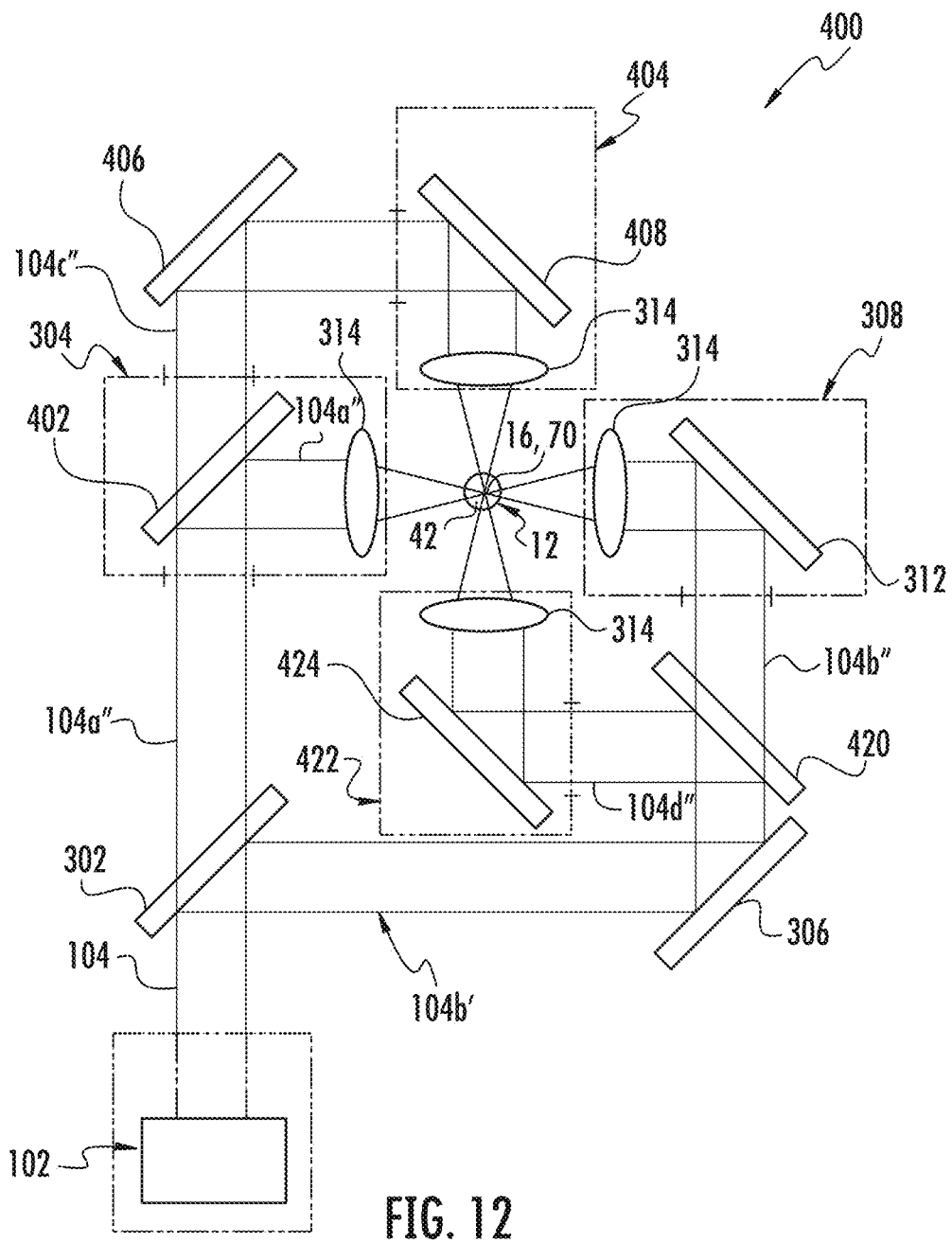
FIG. 12 is a schematic diagram of yet another embodiment of a laser cleaving system.

Embodiments will also be appreciated where one or more lasers 102 emit a laser beam 104 that is split into different portions to distribute the laser energy incident on the end face 42 and end portion 70 of the optical fiber 16. FIGS. 11 and 12 are schematic diagrams of laser cleaving systems 300, 400 according to such embodiments. As can be seen in FIG. 11, the laser cleaving system 300 includes a beam splitter 302 to direct a first portion 104a' of the laser beam emitted by the laser to a first focusing system 304 and a second portion 104b' of the laser beam to a reflective mirror 306. The reflective mirror 306, in turn, directs the second portion 104b' to a second focusing system 308. The first and second focusing systems 304, 308 include respective first and second reflective mirrors 310, 312 to direct the first and second portions 104a', 104b' through one or more beam-shaping elements 314 (e.g., the cylindrical lens 114 and spherical lens 118 in FIG. 7) and toward first and second locations on the end face 42 of the ferrule 12. The manner in which the first and second portions 104a', 104b' are directed to, incident on, and reflected from the end face 42 may be similar to the laser beams 104a, 104b of the laser cleaving system 200 (FIGS. 10 and 10A).

Now referring to FIG. 12, the laser cleaving system 400 is similar to the laser cleaving system 300, but the first reflective mirror 310 is replaced by a beam splitter 402. The beam splitter 402 splits the first portion 104a' of the laser beam into a portion 104a" that is directed through the beam-shaping elements 314 and toward the end face 42 of the ferrule 12 and a portion 104c" that is directed to a third focusing system 404 by a reflective mirror 406. The third focusing system 404, which may include a reflective mirror 408 and beam-shaping elements 314, directs the portion 104c" to a third location on the end face 42 of the ferrule 12. Another difference from the laser cleaving system 200 (FIG. 11) is that the laser cleaving system 400 includes a beam splitter 420 to split the second portion 104b' of the laser beam 104 into a portion 104b" that is directed to the second focusing system 308 and a portion 104d" that is directed to a fourth focusing system 422. The fourth focusing system 422, which may include a reflective mirror 424 and beam-shaping elements 314, directs the portion 104d" to a fourth location on the end face 42 of the ferrule 12.

Figure 13:
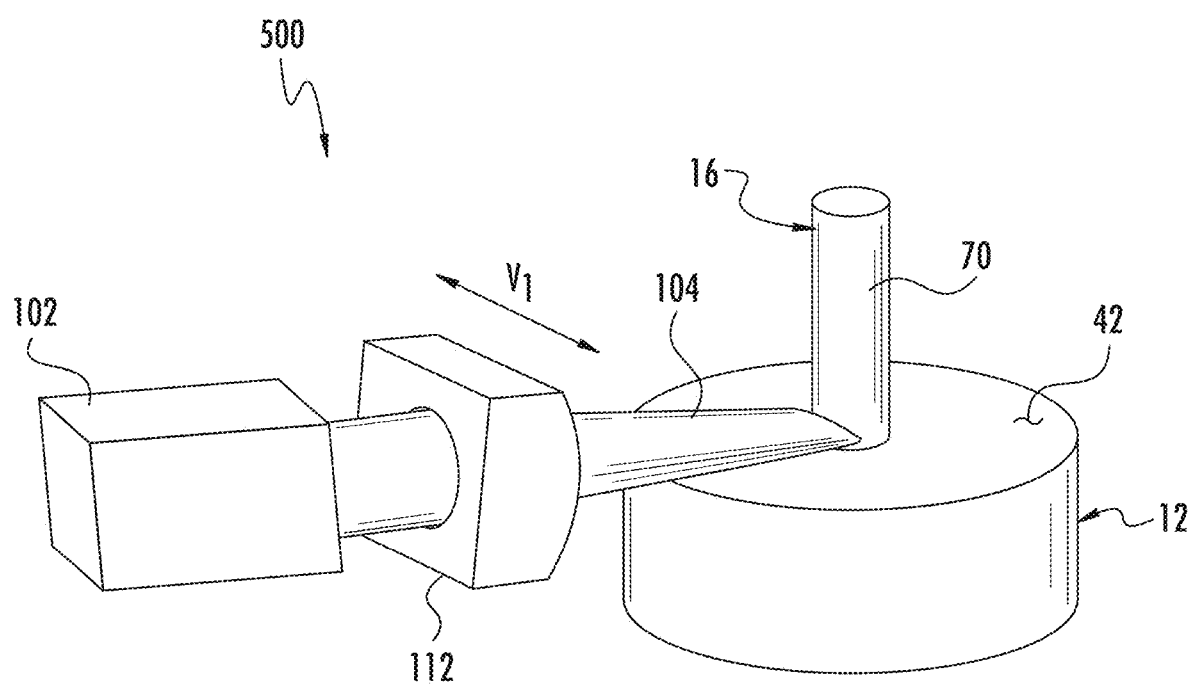
FIG. 13 is a schematic perspective view of yet another embodiment of a laser cleaving system.

It was mentioned above how embodiments involving relative movement between one or more laser beams 104 and the ferrule 12 (and optical fiber 16) will also be appreciated. To this end, FIG. 13 illustrates an example of a laser cleaving system 500 similar to the laser cleaving system 100 (FIG. 6), but being configured so that the laser 102 and focusing system 112 translate back-and-forth at a velocity $V_1$ in a direction perpendicular to the propagation direction $C_1$ (FIG. 4) so that the laser beam 104 sweeps across the end face 34 of the ferrule 12. In alternative embodiments, only the laser 102 or only the focusing system 112 may move, depending on the configuration. Alternatively or additionally, the fixture 110 (FIG. 6; omitted from FIG. 13 to simplify matters) that securely supports the ferrule 12 may translate or rotate.

It was also mentioned above how the laser beam(s) may comprise linearly polarized light in some embodiments. In some embodiments, the laser beam(s) may comprise at least 90 percent linearly polarized light, which is believed to more readily reflect off the end face 42 of the ferrule 12, particularly if the polarized light is oriented perpendicular to the plane of incidence $P_0$ (such polarized light also referred to as "S-polarized" light). Indeed, in some embodiments, the laser beam(s) may even comprise 100 percent linearly polarized light perpendicular to the plane of incidence $P_0$.

Figure 14:
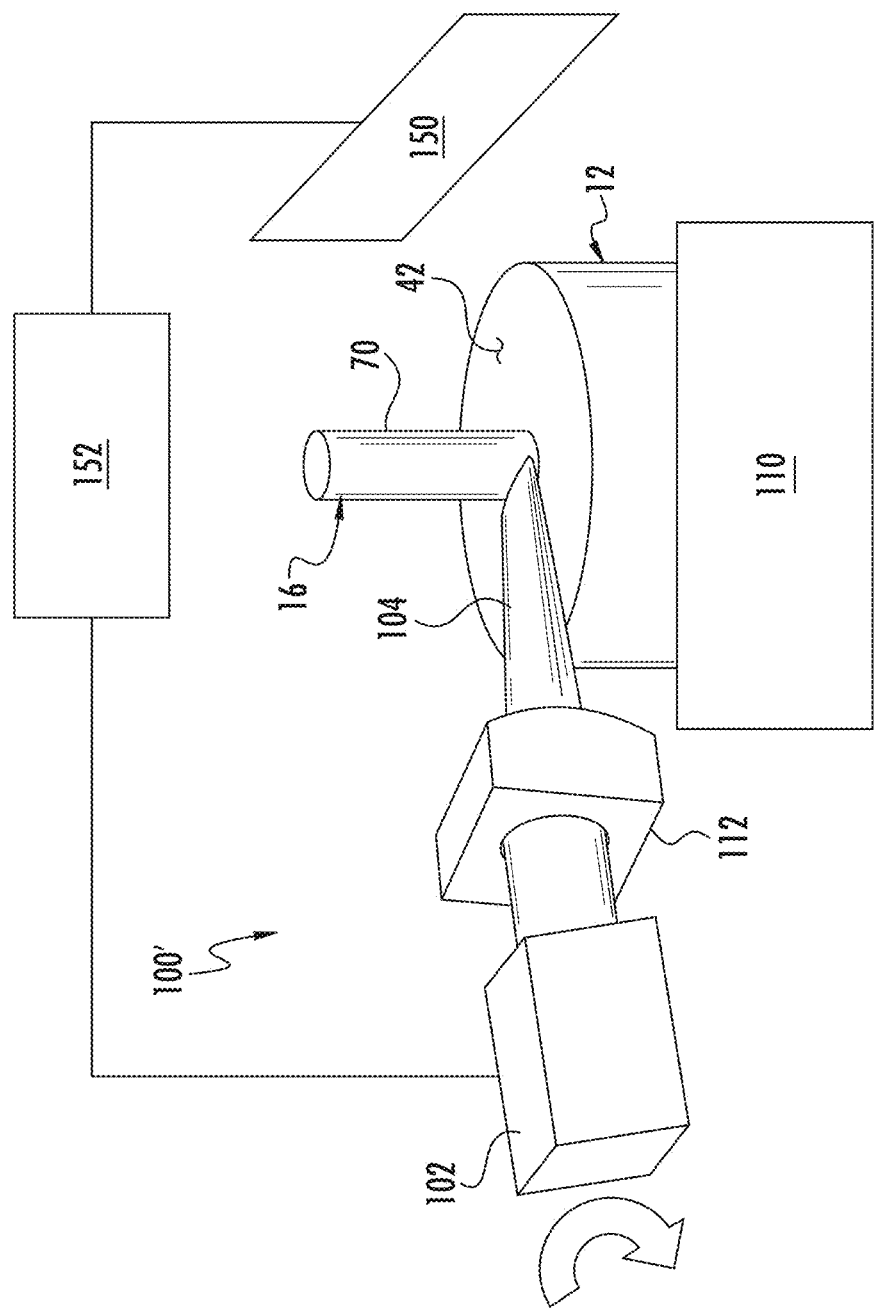
FIG. 14 is a schematic perspective view similar to FIG. 6, but showing the laser cleaving system including an additional feature.

Additional features may be incorporated into any of the systems according to this disclosure. For example, FIG. 14 illustrates a system 100' similar to the system 100, but further including an imaging device or sensor 150 to detect the position of the ferrule 12 and optical fiber 16. The imaging device 150 communicates with a control system 152 that also communicates with the laser 102. As schematically shown, the laser 102 may be rotatable in a manner that would change the orientation of the elliptical beam 104 in a plane perpendicular to the propagation direction $C_1$ (FIG. 5). This ability to change orientation of the elliptical beam 104 can be used to help correct for misalignments or variations in how different ferrules 10 are supported by the fixture 110. For example, the imaging device 150 and control system 152 may detect whether the ferrule 12 is angled ("tilted") relative to an ideal position. If so, the control system 152 can send a signal to rotate the laser 102 so that the beam spot 120 is formed as desired (e.g., in a desired location) on the end face 42.

Figure 15A:
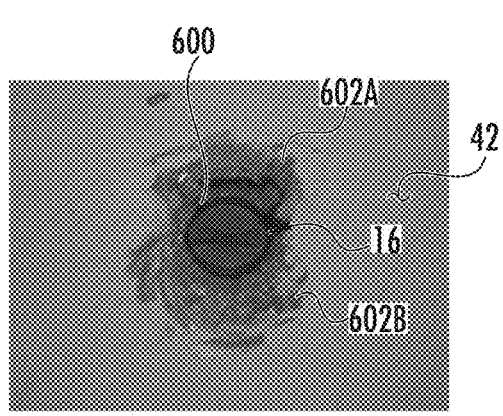
FIGS. 15A and 15B are top close-up views of an exemplary cleaved surface of an optical fiber extending from an end face of a ferrule after laser cleaving observed at a first magnification and a second magnification, respectively.
Figure 15B:
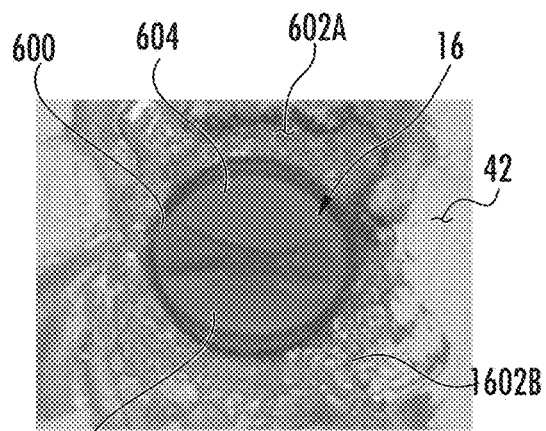
Figure 16A:
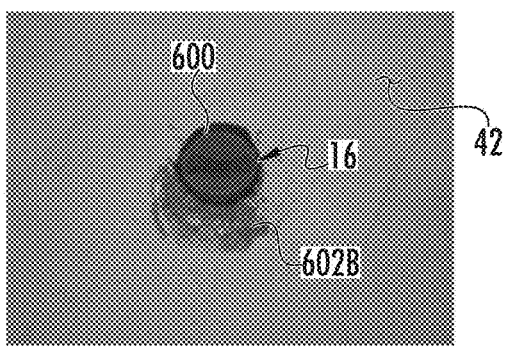
FIGS. 16A and 16B are top close-up views of the cleaved surface and the end face of FIGS. 15A and 15B, respectively, after subsequent wiping with isopropyl alcohol.
Figure 16B:
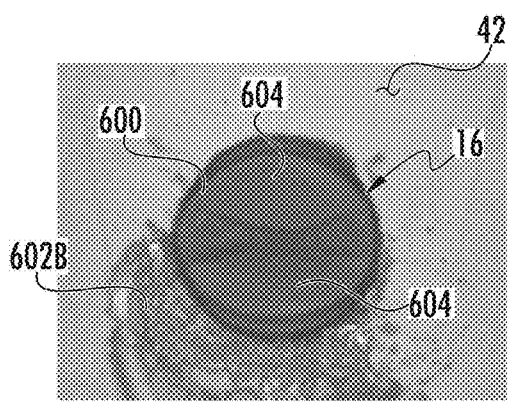
Figure 17A:
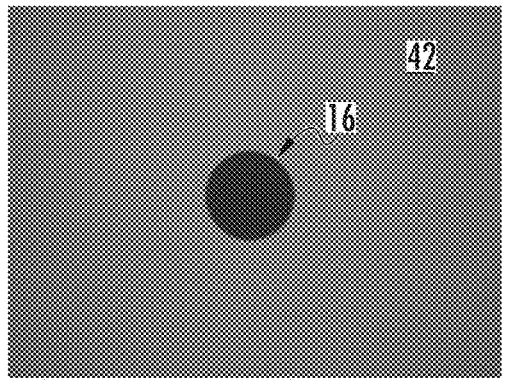
FIGS. 17A and 17B are top close-up views of the cleaved surface and the end face of FIGS. 16A and 16B, respectively, after subsequent hand polishing.
Figure 17B:
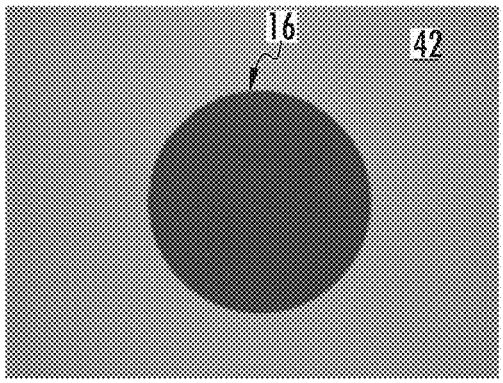

FIGS. 15A and 15B are top close-up views of an exemplary cleaved surface 600 of an optical fiber 16 at a first magnification and second magnification, respectively, where the cleaved surface 600 is formed by a laser cleaving system that reflects portions of a laser beam 104 (or two separate laser beams 104) off the end face 42 of the ferrule 12 at two different locations. The laser cleaving systems 200 (FIG. 10) and 300 (FIG. 11), for example, may result in cleaved surface like that shown in FIGS. 15A and 15B. Ablated material of the optical fiber 16 generated by the thermal forming of the cleaved surface 600 may be disposed as ablated material buildup areas 602A, 602B on the end face 42 of the ferrule 12. The cleaved surface 600 may include depressions 604 identifying where the portions of the laser beam 104 contributed energy. FIGS. 16A and 16B are top close-up views of the cleaved surface 600 and the end face 42 of FIGS. 15A and 15B, respectively, at different magnifications after subsequent wiping with isopropyl alcohol. The ablated material buildup areas 602A, 602B may be reduced as well as the depressions 604. FIGS. 17A and 17B are top close-up views of the cleaved surface 600 and the end face 42 of FIGS. 16A and 16B, respectively, after subsequent hand polishing. The ablated material buildup areas 602A, 602B appear gone, as do the depressions 604 such that the end surface of the optical fiber 16 is now in a final form.

Advantageously, the laser cleaving systems and methods disclosed herein may be made even more effective and/or efficient by tuning the laser(s) to different wavelengths when cleaving the end portion 70 of the optical fiber 16. For example, when using the laser cleaving system 100 with the laser 102 being a quantum cascade laser or other tunable laser, the laser beam 104 may initially be emitted at a first wavelength to ablate some of the end portion 70 of the optical fiber 16 before being tuned to a different wavelength and ablating an additional amount of the end portion 70. The absorption index of the optical fiber 16 may be less at the first wavelength than at the different wavelength so that less energy is absorbed at the surface of the optical fiber 16. The energy is instead absorbed in a greater portion of the optical fiber 16 so that a "deeper" cut is made during the initial stages of operation (e.g., first pulses of the laser 102). By subsequently switching to a wavelength with a higher absorption index, smaller amounts of the optical fiber 16 are ablated so that the distance $H_1$ may be controlled more accurately (e.g., to result in values less than 20 µm, or even less than 10 µm). This process of switching to different wavelengths may be performed a number of times such that the laser beam 104 is emitted at a number of different wavelengths (e.g., two, three, four, etc.) over the course of the overall method of forming the optical surface 600. The final wavelength may be one within 0.1 µm of the absorption peak of the optical fiber 16 to carefully control the distance $H_1$.

Switching to different wavelengths may also be useful to perform operations prior to cleaving. For example, when inserting the optical fiber 16 through the ferrule bore 14 (see FIG. 5), some amount of the bonding agent 72 may be pulled from the ferrule bore 14 and migrate onto the end face 42 of the ferrule 12 (e.g., on the region of the end face 42 around the ferrule bore 14). The system 100 may be used to ablate, and thereby remove, at least some excess amount (i.e., buildup) of the bonding agent 72 on the end face 42 prior to cleaving the end portion 70 of the optical fiber 16 to help ensure that the bonding agent 72 on the end face 42 does not interfere with the cleaving process or otherwise prevent a close cleave. Because the bonding agent 72 has different properties than the optical fiber 16, it may be advantageous to emit the laser beam 104 at a different wavelength than the wavelength(s) used for the cleaving process.

Another example of an additional operation that may be performed by the system 100 prior to cleaving relates to melting the bonding agent 72. The bonding agent 72 may, for example, be loaded into the ferrule bore 14 as a solid material and potentially stored in the ferrule bore 14 a significant amount of time (e.g., at least one day, one week, one month, etc.) prior to assembling the connector 10 on the optical fiber 16. In such embodiments, it may be necessary to heat the ferrule 12 to melt the bonding agent 72 immediately prior to inserting the optical fiber 16 into the ferrule bore 14. Examples of such bonding agents and heating processes are disclosed in U.S. Pat. Nos. 8,702,322, and 9,588,303. The laser(s) 102 in the systems and methods according to this disclosure may be used as the source of energy in the heating processes in similar embodiments. And because heating the ferrule 12 to melt the bonding agent 72 involves different considerations than cleaving the optical fiber 16, it may be advantageous to emit the laser beam(s) 104 at a different wavelength than the wavelength(s) used for the cleaving process.

Figure 18:
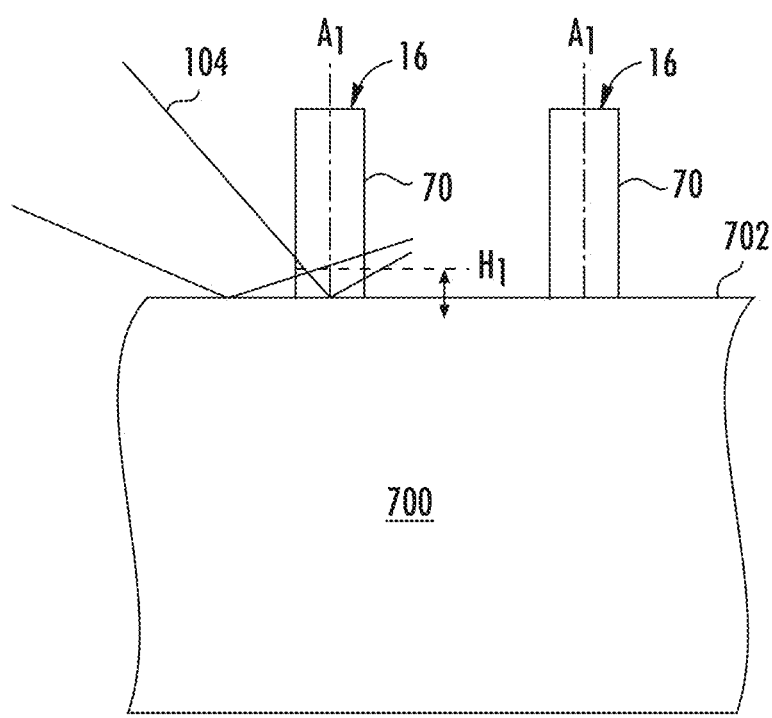
FIG. 18 is a schematic side view of more than one optical fiber supported by a holding member, illustrating how the laser cleaving methods according to this disclosure may be used to cleave multiple optical fibers.

It will be apparent to those skilled in the art that various modifications and variations can be made without departing from the spirit or scope of the invention. For example, the principles of the embodiments described above may be applied to systems and methods for laser cleaving multiple optical fibers. To this end, FIG. 18 schematically illustrates two optical fibers 16 extending from a holding member 700, which may be a ferrule (e.g., a multifiber ferrule such as an MT ferrule) or other work piece/substrate. One or more laser beams 104 may be used to cleave an end portion 70 of each optical fiber 16 in a manner similar to the systems 100, 200, 300, 400, or 500. The optical fibers 16 may be cleaved sequentially (i.e., one at a time) or simultaneously. Only one of the optical fibers 16 is schematically shown as being cleaved in FIG. 18 for convenience.

Since modifications combinations, sub-combinations and variations of the disclosed embodiments incorporating the spirit and substance of the invention may occur to persons skilled in the art, the invention should be construed to include everything within the scope of the appended claims.

Additionally, unless otherwise expressly stated, it is in no way intended that any method set out below be construed as requiring that its steps be performed in a specific order. Accordingly, where a method claim below does not actually recite an order to be followed by its steps or it is not otherwise specifically stated in the claims or description that the steps are to be limited to a specific order, it is no way intended that any particular order be inferred.

What is claimed is:

1. A method of cleaving an optical fiber, comprising:
inserting the optical fiber through a bore of a holding member so that an end portion of the optical fiber extends past an end face the holding member, wherein the holding member comprises zirconia;
securing the optical fiber to the holding member with a bonding agent that is disposed within at least a portion of the bore;
operating at least one laser to emit at least one laser beam; and
directing the at least one laser beam from the at least one laser to the end face of the holding member so that at least a portion of the at least one laser beam reflects off the end face of the holding member and is thereafter incident on the end portion of the optical fiber;
wherein the at least one laser is operated and the at least one laser beam is directed so that the at least one laser beam comprises a laser fluence of less than 100 J/cm$^2$ when the at least a portion of the at least one laser beam is incident on the end face of the holding member, and so that the at least one laser beam cleaves the end portion of the optical fiber less than 20 µm from the end face of the holding member.

2. The method of claim 1, wherein the holding member comprises a ferrule for an optical fiber connector.

3. The method of claim 1, wherein the at least one laser beam comprises a laser fluence of less than 10 J/cm$^2$ when the at least a portion of the at least one laser beam is incident on the end face of the holding member.

4. The method of claim 1, wherein the at least one laser beam is directed to have a beam spot on the end face of the holding member at a location spaced at least 5 µm from the bore.

5. The method of claim 4, wherein the location of the beam spot on the end face of the holding member is spaced between 5 µm and 40 µm from the bore.

6. The method of claim 1, wherein the at least one laser beam is directed to have a beam spot on the end face of the holding member that overlaps a portion of the bore.

7. The method of claim 1, wherein the at least one laser beam is directed to have a focal point on the end portion of the optical fiber after reflecting off the end face of the holding member.

8. The method of claim 1, wherein the at least one laser beam is shaped into an ellipse when directed to the end face of the holding member so that the ellipse results in an elliptical beam spot on the end face of the holding member.

9. The method of claim 8, wherein the elliptical beam spot has a minimum dimension along a minor axis and a maximum dimension along a major axis, and further wherein the maximum dimension is between 2 and 50 times greater than the minimum dimension.

10. The method of claim 9, wherein the elliptical beam spot has a dimension of at least 30 µm along the minor axis.

11. The method of claim 9, wherein the elliptical beam spot has a dimension of at least 50 µm along the major axis.

12. The method of claim 1, wherein the least one laser beam comprises at least 90 percent linearly polarized light configured to be incident on the end face of the holding member as S-polarized light.

13. The method of claim 1, wherein the at least one laser beam is emitted with a wavelength between 200 nm and 11 µm.

14. The method of claim 13, wherein the optical fiber comprises silica and the at least one laser beam is emitted with a wavelength between 8.0 and 9.4 μm.

15. The method of claim 1, wherein the boding agent comprises a solid material that is disposed in within at least of portion of the bore before inserting the optical fiber through the bore, the method further comprising:
operating the at least one laser and directing the at least one laser beam to heat the holding member so that the bonding agent melts before inserting the optical fiber through the bore.

16. The method of claim 1, wherein the at least one laser beam is directed to the end face of the holding member without relative movement between a profile of the at least one laser beam and the holding member when the at least one laser beam is emitted.

17. The method of claim 16, wherein operating the at least one laser comprises:
operating the at least one laser for several pulses in a first position of the at least one laser relative to the holding member;
causing relative movement between the at least one laser and the holding member to bring the at least one laser to a second position relative to the end of the holding member; and
operating the at least one laser for several pulses in the second position of the at least one laser relative to the holding member.

18. The method of claim 1, further comprising sweeping the at least one laser beam across the end face of the holding member when the at least one laser emits the at least one laser beam.

19. The method of claim 1, wherein operating the at least one laser and directing the at least one laser beam comprises reflecting the at least one laser beam off the end face of the holding member at two or more spaced-apart locations on the end face to cleave the end portion of the optical fiber.

20. The method of claim 1, further comprising:
inserting at least one additional optical fiber through at least one additional bore of the holding member so that an end portion of the at least one additional optical fiber extends past the end face the holding member; and
repeating the securing, operating, and directing steps with respect to the at least one additional optical fiber to cleave the end portion of the at least one additional optical fiber less than 20 μm from the end face of the holding member.

21. The method of claim 1, wherein the at least one laser can be tuned to different wavelengths, and further wherein operating the at least one laser to cleave the end portion of the optical fiber comprises:
(a) ablating some of the end portion of the optical fiber with the at least one laser beam emitted at a first wavelength;
(b) tuning the at least one laser to a different wavelength; and
(c) ablating an additional amount of the end portion of the optical fiber with the at least one laser beam emitted at the different wavelength.

22. The method of claim 21, wherein the absorption index of the optical fiber to the at least one laser beam is less at the first wavelength than at the different wavelength.

23. The method of claim 21, wherein the different wavelength is within 0.1 μm of a peak absorption wavelength the optical fiber.

24. The method of claim 21, further comprising:
repeating steps (b) and (c) of claim 21 at least once such that the at least one laser beam is operated at three or more different wavelengths to cleave the end portion of the optical fiber.

25. A method of cleaving an optical fiber, comprising:
inserting the optical fiber through a bore of a holding member so that an end portion of the optical fiber extends past an end face of the holding member;
securing the optical fiber to the holding member with a bonding agent that is disposed within at least a portion of the bore;
operating at least one laser to emit at least one laser beam; and
directing the at least one laser beam from the at least one laser to the end face of the holding member;
wherein the at least one laser is operated so that the at least one laser beam cleaves the end portion of the optical fiber by:
(a) ablating some of the end portion of the optical fiber with the at least one laser beam emitted at a first wavelength and a laser fluence of less than 100 J/cm$^2$;
(b) tuning the at least one laser to a different wavelength; and
(c) ablating an additional amount of the end portion of the optical fiber with the at least one laser beam emitted at the different wavelength.

26. The method of claim 25, wherein the holding member comprises a ferrule for an optical fiber connector.

27. The method of claim 25, wherein an absorption index of the optical fiber to the at least one laser beam is less at the first wavelength than at the different wavelength.

28. The method of claim 25, wherein the different wavelength is within 0.1 μm of a peak absorption wavelength the optical fiber.

29. The method of claim 25, further comprising:
repeating steps (b) and (c) of claim 25 at least once such that the at least one laser beam is operated at three or more different wavelengths to cleave the end portion of the optical fiber.

30. The method of claim 25, wherein the at least one laser is operated and the at least one laser beam is directed so that the at least one laser beam cleaves the end portion of the optical fiber less than 20 μm from the end face of the holding member.

31. The method of claim 25, wherein the at least one laser beam is directed so that at least a portion of the at least one laser beam reflects off the end face of the holding member and is thereafter incident on the end portion of the optical fiber.

32. The method of claim 31, wherein the at least one laser beam is directed to have a beam spot on the end face of the holding member at a location spaced at least 5 μm from the bore.

33. The method of claim 31, wherein the at least one laser beam is directed to have a beam spot on the end face of the holding member that overlaps a portion of the bore.

34. The method of claim 25, wherein the at least one laser is operated and the at least one laser beam is directed so that the at least one laser beam comprises a laser fluence of less than 100 J/cm$^2$ when the at least a portion of the at least one laser beam is incident on the end face of the holding member.

35. The method of claim 25, wherein the boding agent comprises a solid material that is disposed in within at least of portion of the bore before inserting the optical fiber through the bore, the method further comprising:

operating the at least one laser and directing the at least one laser beam to heat the holding member so that the bonding agent melts before inserting the optical fiber through the bore.

36. The method of claim 35, wherein operating the at least one laser and directing the at least one laser beam to heat the holding member so that the bonding agent melts comprises emitting the at least one laser beam at a wavelength different than the first wavelength.

37. The method of claim 25, wherein an excess amount of bonding agent resides on the end face of the holding member after securing the optical fiber to the holding member, the method further comprising:

operating the at least one laser and directing the at least one laser beam to ablate at least some of the excess amount of bonding agent before operating the at least one laser and directing the at least one laser beam to cleave the optical fiber, wherein operating the at least one laser and directing the at least one laser beam to ablate at least some of the excess amount of bonding agent comprises emitting the at least one laser beam at a wavelength different than the first wavelength.

38. The method of claim 25, further comprising:

inserting at least one additional optical fiber through at least one additional bore of the holding member so that an end portion of the at least one additional optical fiber extends past the end face the holding member; and repeating the securing, operating, and directing steps with respect to the at least one additional optical fiber to cleave the end portion of the at least one additional optical fiber.

39. A system for laser cleaving an end portion of an optical fiber that protrudes from an end face of a holding member after extending through a bore of the holding member, the system comprising:

at least one laser configured to emit at least one laser beam; and a fixture configured to securely support the holding member relative to the at least one laser;

wherein the system is configured to direct the at least one laser beam to the end face of the holding member and operate the at least one laser so that:

at least a portion of the at least one laser beam reflects off the end face of the holding member and is thereafter incident on the end portion of the optical fiber;

the at least one laser beam comprises a laser fluence of less than 100 J/cm$^2$ when the at least a portion of the at least one laser beam is incident on the end face of the holding member, and the at least one laser beam cleaves the end portion of the optical fiber less than 20 μm from the end face of the holding member.

40. The system of claim 39, wherein the at least one laser is tunable to different wavelengths.

41. A system for laser cleaving an end portion of an optical fiber that protrudes from an end face of a holding member after extending through a bore of the holding member, the system comprising:

at least one laser configured to emit at least one laser beam, wherein the at least one laser is tunable to different wavelengths; and a fixture configured to securely support the holding member relative to the at least one laser;

wherein the system is configured to direct the at least one laser beam to the end face of the holding and operate the at least one laser so that the at least one laser beam cleaves the end portion of the optical fiber by:

ablating some of the end portion of the optical fiber with the at least one laser beam emitted at a first wavelength and a laser fluence of 100 J/cm$^2$; and ablating an additional amount of the end portion of the optical fiber with the at least one laser beam emitted at the different wavelength.

\* \* \* \* \*

UNITED STATES PATENT AND TRADEMARK OFFICE
CERTIFICATE OF CORRECTION

| | |
|---|---|
| PATENT NO. | : 11,256,039 B2 |
| APPLICATION NO. | : 16/850167 |
| DATED | : February 22, 2022 |
| INVENTOR(S) | : Joel Patrick Carberry et al. |

It is certified that error appears in the above-identified patent and that said Letters Patent is hereby corrected as shown below:

On the Title Page

On the page 2, in Column 2, under "Other Publications", Line 36, delete "Opitcal" and insert -- Optical --.

In the Claims

In Column 12, Line 8, in Claim 1, delete "face the" and insert -- face of the --.

In Column 13, Line 4, in Claim 15, delete "boding" and insert -- bonding --.

In Column 13, Line 44, in Claim 20, delete "face the" and insert -- face of the --.

In Column 14, Line 64, in Claim 35, delete "boding" and insert -- bonding --.

In Column 15, Line 28, in Claim 38, delete "face the" and insert -- face of the --.

Signed and Sealed this
Twenty-eighth Day of June, 2022

Katherine Kelly Vidal
*Director of the United States Patent and Trademark Office*